(12) United States Patent
Welborn et al.

(10) Patent No.: US 8,009,658 B2
(45) Date of Patent: Aug. 30, 2011

(54) METHOD FOR SHARING BANDWIDTH USING REDUCED DUTY CYCLE SIGNALS AND MEDIA ACCESS CONTROL

(75) Inventors: Matthew L. Welborn, Vienna, VA (US); William M. Shvodian, McLean, VA (US); Joel Z. Apisdorf, Reston, VA (US); Timothy R. Miller, Arlington, VA (US); John W. McCorkle, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 12/458,051

(22) Filed: Jun. 30, 2009

(65) Prior Publication Data

US 2009/0268701 A1    Oct. 29, 2009

Related U.S. Application Data

(62) Division of application No. 11/128,269, filed on May 13, 2005, now Pat. No. 7,570,627.

(60) Provisional application No. 60/660,324, filed on Mar. 11, 2004.

(51) Int. Cl.
*H04J 3/00* (2006.01)
*H04W 4/00* (2009.01)
*H04W 72/00* (2009.01)
*H04B 7/212* (2006.01)
*H04B 1/04* (2006.01)
*H04M 1/00* (2006.01)

(52) U.S. Cl. ........ 370/345; 370/336; 370/338; 370/347; 455/450; 455/522; 455/127.1

(58) Field of Classification Search .................. 370/336, 370/345, 338, 475, 347; 455/450, 522, 127.1
See application file for complete search history.

(56) References Cited

U.S. PATENT DOCUMENTS

| | | | |
|---|---|---|---|
| 5,896,368 A | 4/1999 | Dahlman et al. | |
| 5,917,813 A * | 6/1999 | Van Driel et al. | 370/348 |
| 6,574,211 B2 * | 6/2003 | Padovani et al. | 370/347 |
| 6,694,104 B1 | 2/2004 | Caplan et al. | |
| 6,728,550 B1 | 4/2004 | Bohnke et al. | |

(Continued)

OTHER PUBLICATIONS

Notification of Transmittal of the International Search Report and the Written Opinion of the International Searching Authority, or the Declaration mailed Aug. 9, 2007 in corresponding PCT Patent Application No. PCT/US06/007470.

*Primary Examiner* — Dwayne Bost
*Assistant Examiner* — Ariel Balaoing (57) ABSTRACT

A method is provided for transmitting data. A first device generates a first signal having a first duty cycle, comprising a first gated-on portion and a first gated-off portion in a time slot; and a second device generates a second signal having second duty cycle, comprising a second gated-on portion and a second gated-off portion in the same time slot. The first gated-on portion is generated during a first segment of the time slot and the first gated-off portion is generated during a second segment of the time slot, while the second gated-on portion is generated during the second segment and the second gated-off portion is generated during the first segment. Media access control (MAC) can be used to further define positions within time slots and provide error correction, power control, and the like. A preamble can be transmitted at an increased power level to facilitate acquisition.

12 Claims, 9 Drawing Sheets

U.S. PATENT DOCUMENTS

| | | | |
|---|---|---|---|
| 2001/0028638 A1* | 10/2001 | Walton et al. | 370/335 |
| 2001/0048727 A1 | 12/2001 | Schmutz et al. | |
| 2001/0055293 A1 | 12/2001 | Parsa et al. | |
| 2002/0013135 A1* | 1/2002 | Proctor, Jr. | 455/228 |
| 2002/0061012 A1 | 5/2002 | Thi et al. | |
| 2003/0007473 A1 | 1/2003 | Strong et al. | |
| 2003/0086393 A1 | 5/2003 | Vasudevan et al. | |
| 2003/0137993 A1* | 7/2003 | Odman | 370/468 |
| 2003/0161411 A1 | 8/2003 | McCorkle et al. | |
| 2003/0228875 A1 | 12/2003 | Alapuranen | |
| 2004/0028003 A1 | 2/2004 | Diener et al. | |
| 2004/0037238 A1* | 2/2004 | Schiff et al. | 370/321 |
| 2004/0140914 A1 | 7/2004 | Aldridge et al. | |
| 2004/0190666 A1 | 9/2004 | Aiello et al. | |
| 2004/0208533 A1 | 10/2004 | Corbeil et al. | |
| 2005/0013386 A1 | 1/2005 | Ojard | |
| 2005/0013387 A1 | 1/2005 | Ojard | |
| 2005/0041605 A1* | 2/2005 | Benson | 370/280 |
| 2005/0152264 A1* | 7/2005 | Siwiak | 370/206 |
| 2006/0203795 A1 | 9/2006 | Welborn et al. | |

* cited by examiner

METHOD FOR SHARING BANDWIDTH USING REDUCED DUTY CYCLE SIGNALS AND MEDIA ACCESS CONTROL

CROSS REFERENCE TO RELATED APPLICATIONS

The present invention is a divisional from U.S. patent application Ser. No. 11/128,269 filed on May 13, 2005, which is related to and claims priority from U.S. Provisional Patent Application Ser. No. 60/660,324 filed on Mar. 11, 2004.

FIELD OF THE INVENTION

The present invention relates in general to time division multiple access (TDMA) signal transmission schemes, including those used for ultra wideband (UWB) systems. In particular the present invention relates to TDMA signal transmission schemes having assigned time slots broken into smaller nominal time slots.

Within each nominal time slot a transmitter can transfer data to multiple devices in bursts having a power level based on duty cycle. Power levels can further be controlled such that power levels for each device can be adjusted. To further increase efficiency, data aggregation can be performed based on parameters associated with the Physical Layer (PHY) such as the power level, the data rate, the Channel Time Allocation (CTA) or time slot duration, or the like. One aspect of the present invention relates to a TDMA scheme in which a transmitter can transfer data to multiple devices at a lower than 100% duty cycle within, for example, the same nominal time slot. Another aspect of the present invention relates to determining and adjusting power levels for burst transmissions within a nominal time slot such that transmissions from an exemplary transmitter do not violate average transmit power limits imposed by various regulatory agencies.

BACKGROUND OF THE INVENTION

When operating wireless networks, problems can occur when multiple networks or multiple devices are operating using the same channel or the same bandwidth. Such problems can include contention problems leading to collisions, crosstalk, interference or the like. Furthermore, when operating within a regulated operating band, strict power levels must be observed to reduce interference while preserving performance and efficiency. Since some devices configured to work within the UWB spectrum are battery operated power efficiency is also a concern as is bandwidth utilization, channel efficiency, and the like.

One common approach to addressing the multiple device issue in wireless networking is the use of a frequency division multiple access (FDMA) scheme. Such an implementation is often used in narrow band systems. In an FDMA scheme, different networks or devices are assigned a different frequency band. In theory, provided each network or device uses its assigned portion of the spectrum, it can be assured that other networks or devices will not interfere within the assigned frequency portion. An example of FDMA is a conventional analog cellular radio or radiotelephone system with each voice channel being assigned a unique uplink frequency channel and downlink frequency channel within a cell or neighborhood of cells.

It will be appreciated that FDMA approaches are not readily applicable in a UWB environment since UWB transmissions by definition occupy a wide frequency band. In UWB systems, due to the use of narrow pulses in the time domain, transmission energy is spread across the frequency spectrum. Thus, for UWB systems it is not feasible to allocate mutually exclusive frequency bands within the available spectrum.

Another approach to contention in is to use a code division multiple access (CDMA) scheme. In a CDMA scheme, networks and devices transmit over the same frequency spectrum and at the same time, but signals from each are encoded using codes specially chosen to minimize their interference with each other by maximizing isolating characteristics of the transmissions. Characteristics include code distance or code separation associated with codes used in transmissions destined to one receiver from those destined to another receiver.

CDMA schemes also have limitations. First, the code set having the desired isolation properties needed to keep overlapping networks and devices separate is finite limiting the number of networks or devices that can operate at the same time in a given area. Second, code separation provided by the use of CDMA codes does not result in perfect isolation particularly given effects of multipath, fading, and the like. As a result a near-far problem may arise where a close device of a different network can overpower and obliterate a signal from a distant device of the same network despite the use of codes by the close device chosen to minimize interference with the other network.

Yet another approach for handling multiple devices is the use of a time division multiple access (TDMA) scheme. In a TDMA scheme, the available transmission time is allocated into multiple time slots, and each network or device is assigned one or more of the time slots. Thus, each device is given some portion of the available transmission time to use and remains silent during all other times. In a TDMA scheme each network or device experiences an overall reduction in transfer speed, particularly for large quantities of data, since transmission is limited to dedicated portions of the total available channel time. As the number of overlapping networks or devices increases, transfer speed for individual devices is correspondingly reduced. For example, a 100 megabits per second (Mbps) capacity divided evenly over four separate networks or devices results in a 25 Mbps transmission speed for each individual device or network. It will be appreciated that other factors such as the likelihood of error combined with the need for acknowledgments (ACKs), the need to retransmit erroneous or dropped packets on a particular channel, and the packet retransmission scheme, can also affect the net transfer speed for each device or network.

One way to transmit more data in a TDMA scheme is to increase the transmission power for a given network or device. In a digital system, for example, using a stronger signal means that each individual bit of data requires less time to send, enabling the device to operate at an increased data rate. A significantly increased transmit power can, therefore, compensate for time lost when other networks or devices are transmitting. However since, in the United States, the Federal Communications Commission (FCC) imposes restrictions such as limits on the maximum allowable transmit power for UWB signals, and since the likelihood is strong of similar agencies in other countries imposing similar restrictions, the maximum capacity for UWB systems is limited.

Therefore, if a TDMA scheme is used in the UWB signal transmission environment, it is desirable to maximize the transmit power while minimizing duration in the time domain without violating the maximum signal power restrictions set up by the FCC or similar regulating agency. It is also desirable to achieve greater efficiency in multi-user environments while supporting a number of transmission scenarios, synchronous, asynchronous, isochronous, and the like, and various media access control (MAC) configurations, such as TDMA, carrier sense multiple access (CSMA), polling, and the like.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF PREFERRED EMBODIMENTS

Wireless Network

Figure 1:
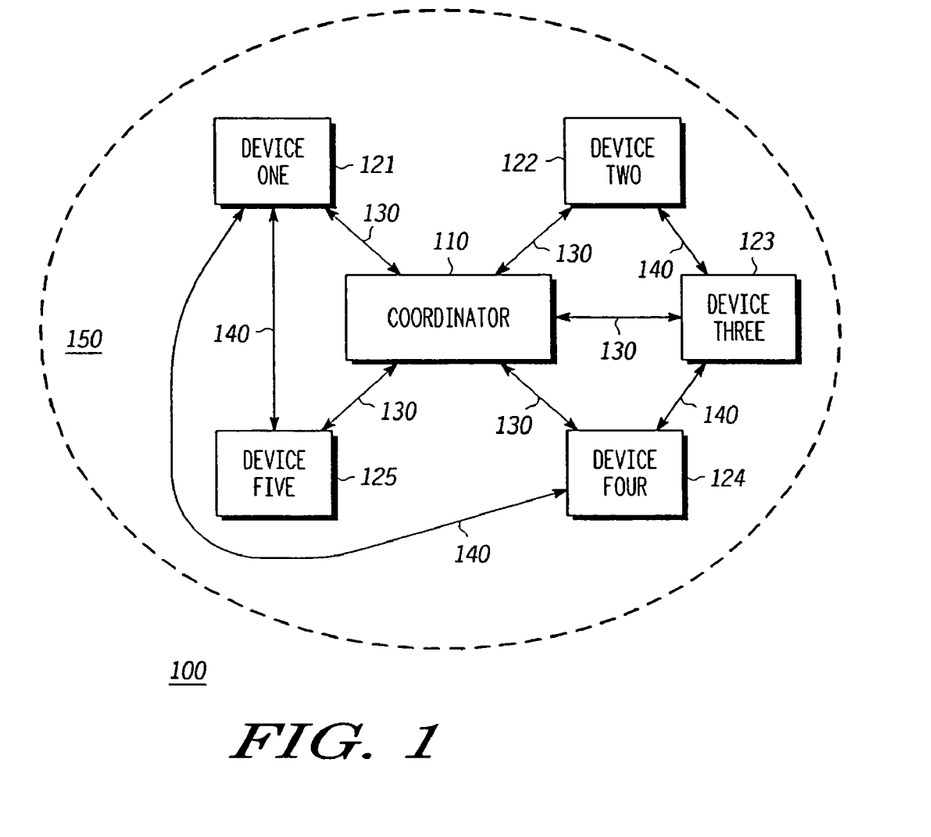
FIG. 1 is a block diagram illustrating a wireless network according to an embodiment of the present invention.

FIG. 1 is a block diagram of a wireless network 100 according to an embodiment of the present invention. The wireless network 100 can include a wireless personal area network (WPAN), a piconet, or the like. However, it should be understood that the present invention also applies to other settings where bandwidth is to be shared among several users, such as, for example, wireless local area networks (WLAN), or any other wireless network.

The term piconet generally refers to an ad-hoc network of wireless devices close in proximity. In a classic piconet, nodes may be connected in an ad-hoc fashion meaning the network can be extended indefinitely through connections made during operation where each node acts as a router. In a fixed network such as a point to point or point to multi-point network, one device can act as a coordinator, a server, a master or the like, while the other device or devices, clients, slaves or the like follow the instructions of the coordinator with regard to time slot allocations and the like. In more general terms, piconet can also be applied to refer to a small fixed network where one device acts as a coordinator. Further, in connection with the present disclosure, a network of networks can be constructed from piconets, WLANS, WPANS, or the like. It will be appreciated that the coordinator can be a dedicated device or can be one of the multiple devices designated to function as a coordinator. One primary difference between the coordinator and non-coordinator devices is that the coordinator must be able to communicate with all of the devices in the network, while the non-coordinator devices need not be able to communicate with all of the other non-coordinator devices.

As shown in FIG. 1, the wireless network 100 includes a coordinator 110 and a plurality of devices 121-125. The coordinator 110 serves to control the operation of the wireless network 100. As noted above, coordinator 110 and devices 121-125 may together be called a piconet, in which case the coordinator 110 may be referred to as a piconet coordinator (PNC). Each of the non-coordinator devices 121-125 must be connected to the coordinator 110 via primary wireless links 130, and may also be connected to one or more other non-coordinator devices 121-125 via secondary wireless links 140, also called peer-to-peer links. Although FIG. 1 shows bi-directional links between devices, it will be appreciated that unidirectional links can be used to represent inter-device wireless links or connections. For example, each bi-directional link 130, 140 could be shown as two unidirectional links in opposite directions.

In some embodiments, the coordinator 110 may be the same type of device as any of the non-coordinator devices 121-125, with the exception of being tasked with the additional functionality for network coordination and an additional requirement of communicating with every device 121-125 in the wireless network 100. In other embodiments the coordinator 110 may be a separate dedicated unit such as a base station or server and may have additional functionality not available in the devices 121-125. In still other embodiments, individual non-coordinator devices 121-125 can be equipped or otherwise include the functional capabilities of a coordinator 10 while being configured or assigned to function as non-coordinator devices. In the event the coordinator leaves the wireless network 100, an alternative coordinator can be assigned upon exit or can be pre-designated to take control after, for example, a silent interval from the coordinator.

It will be appreciated that in some embodiments, each device of the wireless network 100 may be a different wireless device, for example, a digital still camera, a digital video camera, a personal data assistant (PDA), a digital music player, or other personal wireless device. Because of the proximity nature of most wireless networks, the various non-coordinator devices 121-125 are confined to a usable physical area 150, which is set based on the extent to which the coordinator 10 can successfully communicate with each of the non-coordinator devices 121-125 based on the range of the coordinator 110 or the like. Any non-coordinator device 121-125 able to communicate with the coordinator 110 is by definition within the usable area 150 of the wireless network 100. As noted, however, it is not necessary for every non-coordinator device 121-125 in the wireless network 100 to communicate with every other non-coordinator device 121-125 therefore, some non-coordinator devices 121-125 may be unable to communicate with each other while still being able to communicate with the coordinator 110.

Time Division Multiple Access (TDMA) Scheme

As described hereinabove, and in connection with a protocol or other control mechanism data transferred from the coordinator 110 may be arranged at the highest level in repeated superframes which define the coarsest resolution of transmission time division. The time domain in the wireless network 100 may be further divided at a lower level into time slots or, in the case of 802.15.3 channel time allocations (CTAs), within the superframes. CTAs or timeslots may be allocated by the coordinator 110 to individual devices.

Within the superframes individual frames of data are in accordance with the timing set forth in the superframe. It will be appreciated that if the wireless network 100 is sufficiently small, data from superframes can be aggregated in various ways based on PHY operating parameters such as packet size, data type (QoS), slot size, number of devices, transmission power level, and the like. Alternatively, or in addition to the above described method, individual devices can determine aggregation parameters for use by the PNC or the coordinator 110 for example in accordance with the frame convergence sub-layer (FCSL) or the like.

Figure 2:
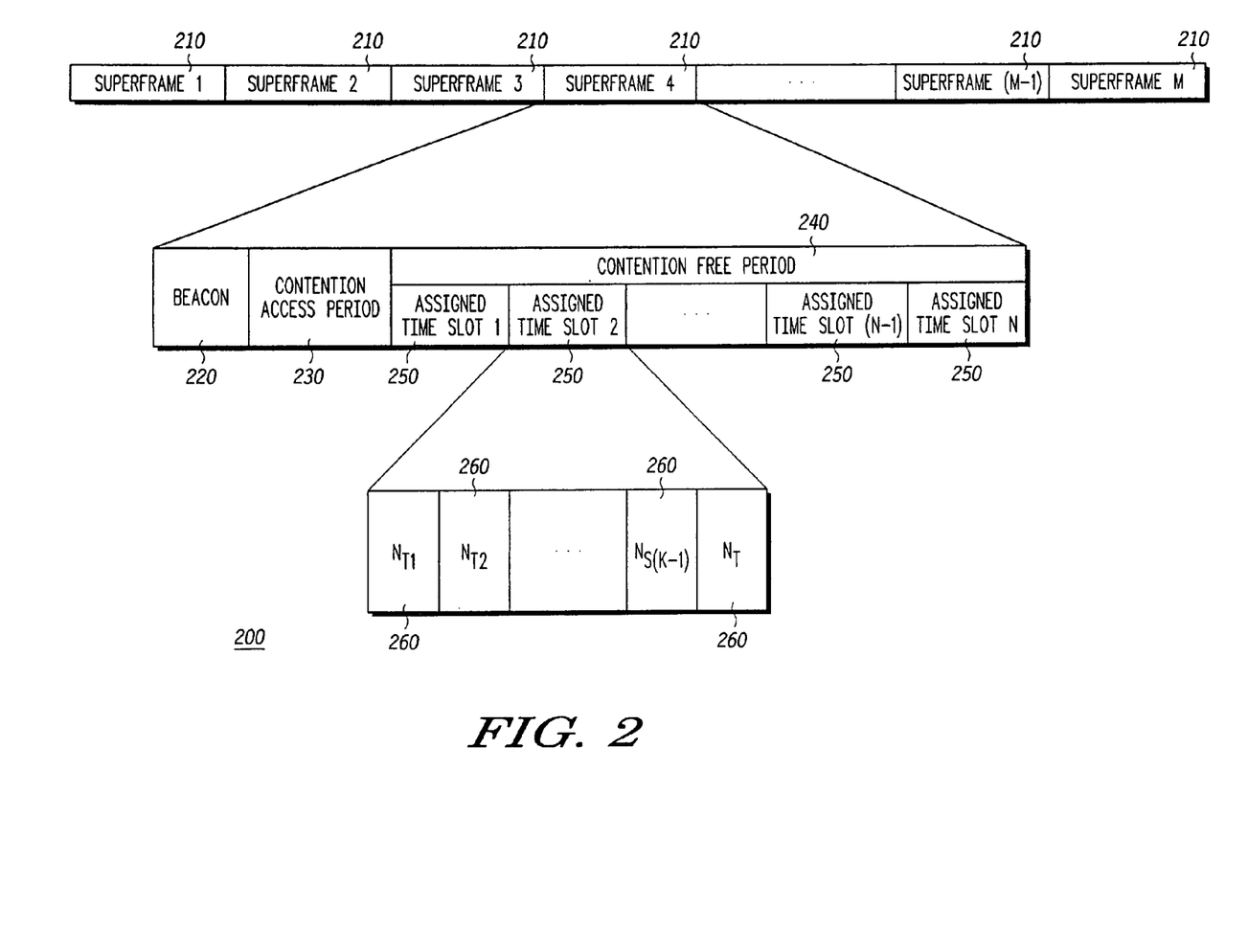
FIG. 2 is a block diagram illustrating an exemplary organizational hierarchy of a TDMA scheme including superframes, time slots, and nominal slots, according to an embodiment of the present invention.

As shown in FIG. 2, a transmission scenario 200 includes plurality of consecutive superframes 210. The allocation of data in superframes 210 follows the model of a continuous stream of information over time. It will be appreciated that while during some time periods no information is transmitted, the TDMA model requires that dedicated frame intervals be allocated such that optimum peak data capacity can be accommodated without reconfiguration during times of high continuous demand and momentary peak demand. Each individual superframe 210 includes media access elements such as a beacon period 220, a contention access period (CAP) 230, and a contention free period (CFP) 240. In the present embodiment, contention for CTA resources from the coordinator 110 may be engaged in by the devices 121-125 during the CAP 230 during which CTA assignments will be made. Once CTAs are assigned, communication may proceed within the assigned CTAs during the CFP 240.

The CFP 240 includes a plurality of assigned time slots 250. To support communications with multiple devices in accordance with the present and other various embodiments, for example those embodiments involving aggregation of data, each assigned time slot 250 may be further divided up into a plurality of nominal time slots 260.

It will be appreciated that the beacon period 220 is set aside for the coordinator 110 to transmit a beacon signal to the non-coordinator devices 121-125 in the wireless network 100 including information for organizing the operation of devices 121-125 such as CTA assignments and the like. Each non-coordinator device 121-125 is configured to recognize the beacon signal during the beacon period 220 prior to joining the wireless network 100, and uses the beacon signal transmitted during beacon period 220 both to identify the wireless network 100 and to coordinate communication within the wireless network 100.

As noted above, the CAP 230 accommodates the transmission of commands or asynchronous data across the wireless network 100 such that devices can contend for channel assignments, or can inform or notify the coordinator of their presence. It will be appreciated that the CAP 230 may be eliminated in many embodiments and the system would then pass commands solely during the CFP 240. Alternatively, in a fractional duty cycle embodiment as will be described in greater detail hereinafter, a contention based CSMA approach can include devices 121-125 negotiating with coordinator 110 during the CAP 230 or during an extended CAP for a duty cycle involving a maximum transmit power level over an averaging interval such as the 1 ms interval of the nominal time slot. In a unrestricted CSMA environment, the CAP may be extended indefinitely, with devices negotiating for duty cycles and coordinator 110 monitoring for permissible duty cycles and power levels based on previous accesses by other devices and associated timing of such accesses. Such an approach can be referred to as distributed media access control. A more typical master-slave wireless network environment embodies the principals of centralized media access control.

As noted, the CFP 240 includes a plurality of time slots 250 each assigned by the coordinator 110 to one or more transmitting devices 110, 121-125 and one or more receiving devices 110, 121-125. While generally each transmitting device will have a single associated receiver, in a fractional duty cycle scenario a single transmitter is configured to transmit to multiple receivers within the same time slot 250. It will be appreciated that the time slots 250 are provided to allow a dedicated time interval for communication between devices 110, 121-125 in accordance with the assignments set forth in the beacon signal transmitted during beacon period 220. It will be appreciated that the size of the time slots 250 can vary by embodiment, but should be large enough to accommodate the data being transferred and in any case is generally 1 ms. Further, data from higher layers such as superframes 210 can be dynamically aggregated to various sizes based on the slot size, the duty cycle fraction, transmit power level, and the like.

As noted above, each time slot 250 may be divided into nominal time slots 260 less than or equal to a nominal size. In one embodiment the nominal size is equal to a power averaging period such as the length of time over which a regulatory body such as the FCC prescribes the measurement of the transmit power in order to meet a specification such as a power spectral density mask or the like. In alternative embodiments the nominal size may be changed to any suitable value.

As noted above, the superframes 210 are fixed time constructs repeated in time and are ideally suited to support the continuous transmission of large volumes of streaming data to a large number of fixed destinations. The specific duration of the superframe 210 can be described in the beacon signal transmitted during beacon period 220. Since the beacon signal transmitted during beacon period 220 generally includes information regarding how often the beacon signal is transmitted by defining how often beacon period 220 is repeated, the duration of the superframe 210 can be derived therefrom. The beacon signal transmitted during beacon period 220 also contains information regarding the wireless network 100, such as the identity of the transmitters and receivers assigned to each assigned time slot 250, the identity of the coordinator 110 and possible other parameters such as assignments within each nominal time slot 260 and the necessary transmission parameters for signals within a nominal time slot 260 such as transmission power levels and the like.

It will be appreciated that in various embodiments, the system clock for the wireless network 100 can be synchronized through the generation and reception of beacon signals during the beacon period 220. Each non-coordinator device 121-125 can store a synchronization point or time upon successful reception of a valid beacon signal transmitted during beacon period 220. The synchronization point or time can be used by the non-coordinator device 121-125 to adjust its own timing.

Although not shown in FIG. 2, one of ordinary skill in the art will appreciate that there may be guard times interspersed between assigned time slots 250. Further, guard time or guard "band" 270 can be placed between nominal time slots 260.

The use of the term guard band is borrowed from frequency based methods but can refer to a time period which insulates the transmission interval from a subsequent or previous interval preventing the two transmission intervals from overlapping in time made possible due to factors such as clock inaccuracy, differences in propagation times and the like.

Nominal Time Slots

Figure 3:
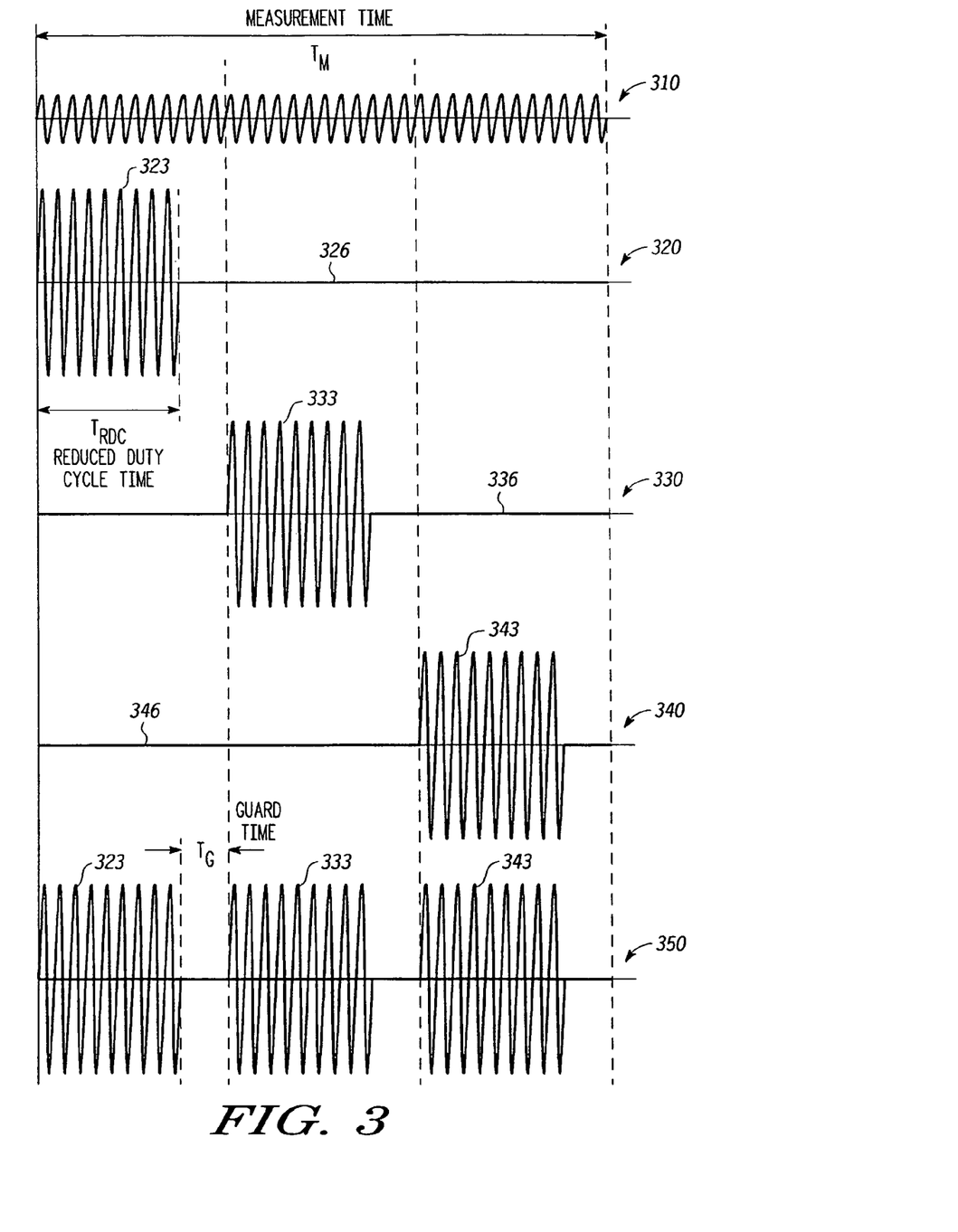
FIG. 3 is a signal diagram illustrating elements of an exemplary nominal slot according to an embodiment of the present invention.

As noted above, the nominal time slot 260 is formed from time slot 250 to allow multiple devices to transmit without exceeding specified transmit power levels. A more detailed illustration of the motivation for the use of nominal time slot 260 is shown in FIG. 3. As noted above, the FCC has imposed limits on the allowable transmit power for a given UWB device over a set measurement time $T_M$, as well as the allowable peak-to-average ratio. In particular, the average power of a UWB transmission using, for example, root-mean-square averaging must be below −41.3 dBm/MHz, averaged over 1 millisecond, and the peak-to-average power must be below 0 dBm/50 MHz peak. Under the FCC rules, the output power of a UWB device is measured in 1 μs blocks (corresponding to 1 MHz), but the measured power is averaged over one millisecond. The averaged output power must be 41.3 dB below a milliwatt and the highest peak power of this transmission must be below 1 milliwatt for any 50 MHz bandwidth window across the whole of the usable bandwidth. As noted, it is expected that regulatory agencies in other countries will impose similar restrictions.

One way to meet maximum power limitation is to transmit a constant UWB signal such as 310 at 100% duty cycle over the measurement period $T_M$. In the present embodiment, $T_M$ will be used to define the slot length 250 within which the power level of the constant UWB signal 310 is set such that it will not exceed the power restrictions as noted. It will be noted that with reference to the UWB signal 310 the peak-to-average power ratio is likely to be relatively small compared to the regulated limit such as about 3:1.

Another way to meet regulatory limitations is to have a first device transmit a first UWB signal 320 at a lowered duty cycle below a 100% duty cycle, including a first gated-on portion 323 or burst interval which is a non-zero portion including one or more wavelets and a first gated-off portion 326 which is a zeroed portion including no wavelets. In accordance with the average power parameters discussed above, as the duty cycle is reduced, the magnitude of the first gated-on portion 323 can be increased to maintain the same average power level, one that approaches but does not exceed the regulatory limit. The magnitude of the first gated-on portion 323 can then be increased with a corresponding reduction in duty cycle until any limit of peak-to-average ratio is reached. If no limit has been set on the peak-to-average ratio, then the lower limit on available duty cycle will likely be a hardware limit involving a physical limit on how low the duty cycle can be set and still have the signal function as required.

Since the first UWB signal 320 has a duty cycle lower than 100%, the gated-off portion 326 is included in part of the measurement time. During the gated-off portion 326, the corresponding device is not transmitting. In accordance with various exemplary embodiments, a subsidiary TDMA scheme can be used such that additional devices can transmit within the measurement time duration such as during the gated-off portion 326. Details of the subsidiary TDMA scheme will be described in greater detail hereinafter and can include an aggregated data packet within the timeslot 250 which allocates nominal slots 260 among multiple devices.

Thus a second device can transmit a second UWB signal 330 also at a lowered duty cycle below 100% having a gated-on portion 333 and a gated-off portion 336. The UWB signal will also meet the regulatory limitations regarding maximum power and peak-to-average ratio. The second gated-on portion 333 can be arranged such that it coincides in time with the gated-off portion 326. A third device can transmit a third UWB signal 340, also at a lowered duty cycle below 100% having a gated-on portion 343 and a gated-off portion 346, such that the regulatory limitations regarding maximum power and peak-to-average ratio are met. The gated-on portion 343 is arranged such that it coincides in time with the gated-off portion 326 and the gated-off portion 336. It will be appreciated that additional devices can transmit provided the duty cycle is reduced in proportion to the number of transmitters such that the transmit power limits are met. It will also be appreciated that the above described scheme is scalable. That is, if power limits per transmitter receiver pair are increased, duty cycles and power levels during the on-times can be adjusted accordingly such that "hotter" transmit levels can be used for the fractional transmissions provided the duty cycles are also adjusted to ensure that the averaged power does not exceed the new limit. As can be seen in the figure, the gated-on portions 323, 333, and 343 can be arranged such that guard times $T_G$ are provided between adjacent gated-on portions. The guard times $T_G$ can be varied in different circumstances and can prevent two adjacent gated-on portions from overlapping in time as described above.

As described above, three devices transmit can transmit UWB signals 320, 330, and 340, respectively, during a nominal time slot 260 defined in length by a measurement time $T_M$. Each UWB signal 320, 330, and 340 is transmitted, for example, at a reduced duty cycle such as at a 25% duty cycle. In general, gated-on portions 323, 333, and 343 have a duration equal to a reduced duty cycle time $T_{RDC}$ that in the case of a 25% duty cycle is approximately ¼ of the measurement time $T_M$ depending on the inclusion of guard times or the like which it will be appreciated can be omitted. In an alternative embodiment, the UWB signals 320, 330, and 340 are transmitted at the same time such as to different devices from the same transmitter, forming a combined UWB signal 350 which fills the available transmission medium. Since the gated-on portions 323, 333, and 343 are arranged in time to avoid overlap, the three transmissions can be sent during the same nominal time slot 260 over the same measurement time $T_M$ without interfering with each other and without exceeding the power limitations. In other words, if the measurement time $T_M$ is chosen to be less than or equal to the measurement time used by the appropriate regulatory agency to measure maximum allowable transmit power, then the UWB signal 350 corresponding for example to the UWB signals 320, 330, and 340 will be compliant with power restrictions.

Although FIG. 3 discloses an embodiment in which three devices each transmit during a measurement time $T_M$ corresponding to a nominal time slot 260 at a 25% duty cycle, or one device transmits to three devices, alternate embodiments can include different numbers of devices and duty cycles chosen. For example the nominal time slot 260 may be split between only two devices each using a 50% duty cycle or more than three devices such as ten devices using a 10% duty cycle or the like. Furthermore, the separate UWB signals 320, 330, 340 need not have the same duty cycle provided that each device transmit at a duty cycle less than 100% and that the sum of all of the duty cycles be less than or equal to 100%. If guard times $T_G$ are used, the available total duty cycle allowed for gated-on portions will have to be reduced by an appropriate amount to provide for the guard times $T_G$.

It should be noted that in various embodiments described herein, the size of a nominal time slot 260 is determined by the measurement time $T_M$ employed by the relevant regulatory agency. For example, in accordance with UWB standards, the FCC has currently set a measurement time $T_M$ of one millisecond. However, it will be appreciated that the measurement time $T_M$ could be changed or other agencies in other jurisdictions could specify a different value. In the event alternate embodiments employ a nominal time slot 260 greater in size than 1 ms, it may be necessary to further adjust allowable duty cycles such that the regulatory total power requirements are met.

It will further be appreciated that FIG. 3 shows a repeated sine wave for each portion of the various UWB signals 310, 320, 330, and 340, by way of example only. In different embodiments, the UWB signals can include different wavelet shapes, different numbers of wavelets, and can include wavelets encoded with digital data using various phase shift modulation methods and the like. However, regardless of the exact character of the wavelet portion of the UWB signal, the selection of duty cycle and orientation of gated on and gated off portions will be analogous to what is shown in FIG. 3 and what is shown and described hereinafter.

Figure 4:
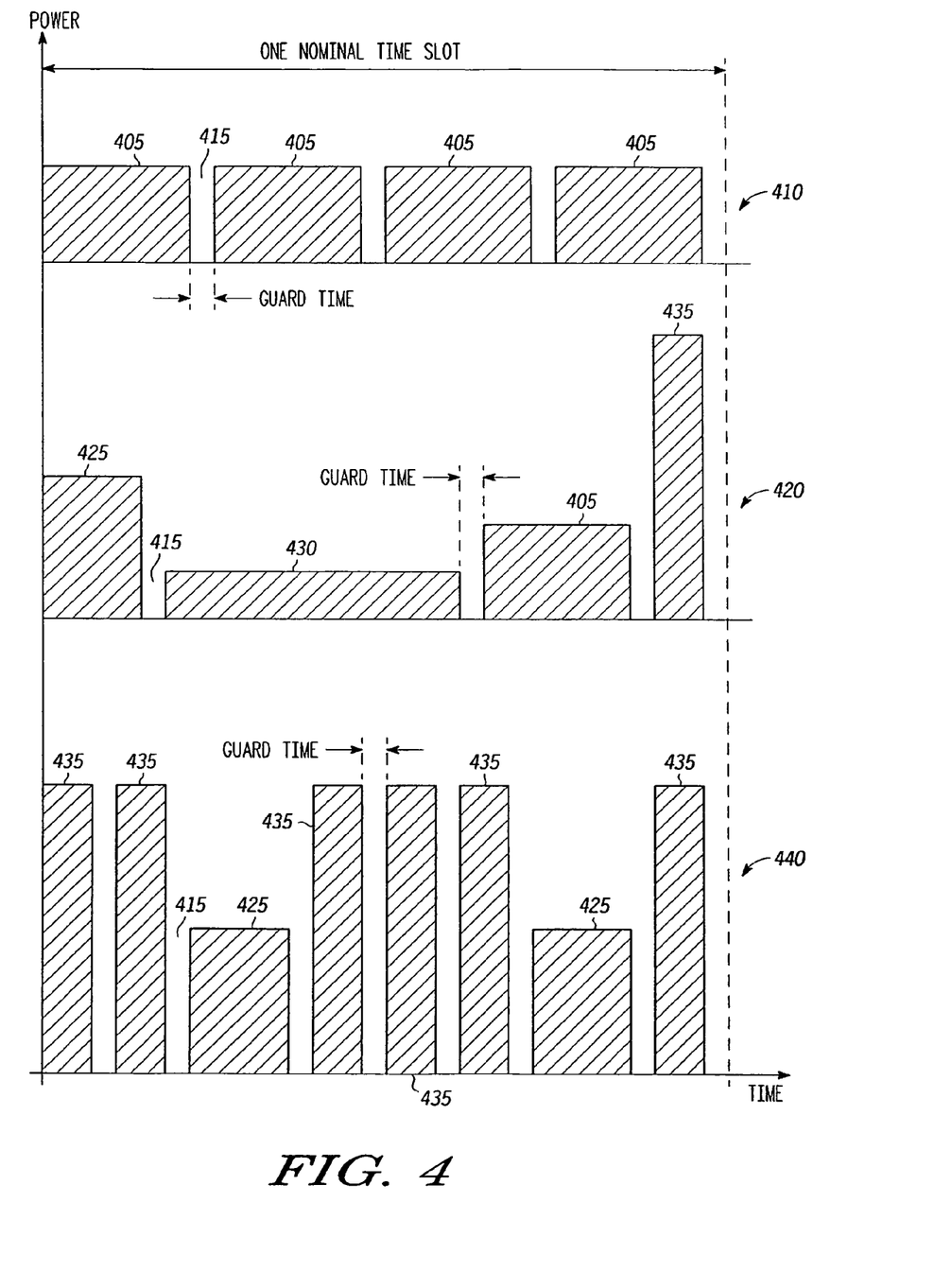
FIG. 4 is a diagram illustrating implementations of nominal slots according to various embodiments of the present invention.

To better appreciate aspects of the present invention including the implications of the relationship between power levels vs. duty cycle, reference is made to FIG. 4. Three exemplary nominal time slots 410, 420, and 440 are shown with various configurations of transmit power level and duty cycle. The cumulative power of a given signal is represented by a shaded box and, as shown, can vary within a single nominal time slot based on transmit power level and duty cycle. A first exemplary nominal time slot 410 includes four identical burst intervals 405 each having a guard time 415 separating the intervals from each other for the reasons noted hereinabove. It will be appreciated that in some embodiments, the burst intervals 405 can be addressed from one transmitter to four receivers, can represent four separate transmissions within the nominal timeslot 410, or the like. In this example, it can be seen that in the case where each of the burst intervals 405 is transmitting with a 25% duty cycle the average power over the nominal time slot interval will be four times the average power for one burst.

A second exemplary nominal time slot 420 includes burst intervals 405, 425, 430, and 435 with different power levels. Each of the burst intervals 405, 425, 430, and 435 has a duty cycle in inverse proportion to the transmit power level for the burst interval such that the combined duty cycles, taking into account guard times if present, equal 100% and the total average power over the length of the nominal time slot 420 within the requirements of total power or peak-to-average ratio. It will be appreciated that one possible motivation for varying the duty cycle and transmit power levels for burst intervals 405, 425, 430, and 435 may to account for evolution in the operating parameters of UWB devices and to provide legacy support for more established operating parameters. For example, in early implementations, UWB signals might have been designed with one minimum duty cycle in mind, while more recent devices designed to incorporate more recent UWB technology advances might incorporate designs involving shorter duty cycles and higher transmit power levels. The present invention will accommodate a number of duty cycle vs. transmit power configurations, since the individual UWB signals need not be identical to operate within a nominal time slot such as the nominal time slot 260 as describe above. Older UWB signal formats can be transmitted alongside new UWB signal formats provided basic operating parameters such as slot timing considerations are met.

A third exemplary nominal time slot 440 shows that as duty cycles associated with burst intervals 425 and 435 are reduced, a greater number of UWB signals can be fit into the same nominal time slot 260. In the third exemplary nominal time slot 440, eight separate burst intervals 425 and 435 associated with eight separate UWB signal transmissions in connection with eight separate devices can be present during the same nominal time slot 260. It will be appreciated that the eight burst intervals 425 and 435 can represent one transmitter sending bursts to up to eight devices or any combination of eight transmissions subject to the media access control protocols as will be described hereinafter.

System Operation

The use of nominal time slots can be particularly effective when a local network has a neighbor network or a child network to accommodate. Because they are so close in space, neighbor networks or parent/child networks must share an available channel with a local network. Under normal circumstances, each of the networks such as the local, neighbor, child network must accept a fraction of the available channel time in order to avoid interfering. However, by using reduced duty cycle UWB transmissions combined in nominal time slots each network can effectively use all or most of the available channel time.

Figure 5:
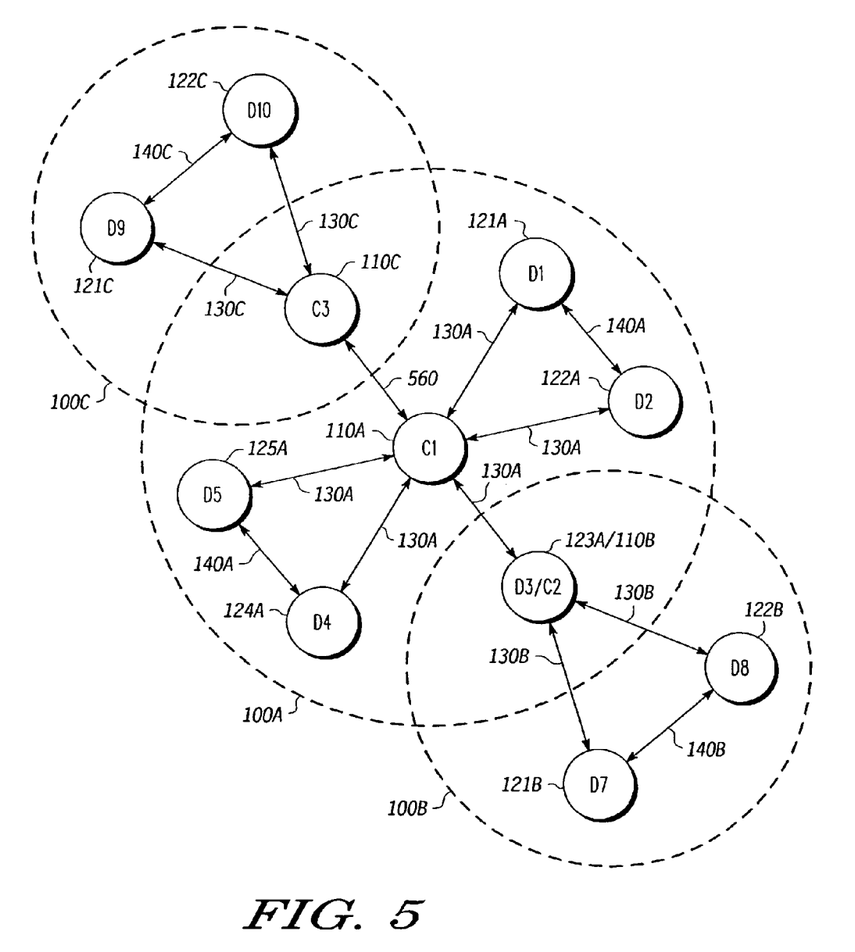
FIG. 5 is a diagram illustrating a local network having associated child and neighbor networks, according to an embodiment of the present invention.

As shown in FIG. 5, one exemplary wireless network environment can include a local network 100a connected with a child network 100b which in turn shares a device in common with the local network 100a. Further, the local network 100a can connect with a neighbor network 100c which also shares a device in common with the local network 100a. The local network 100a can include a local coordinator 110a, and local non-coordinator devices 121a-125a. As noted above with respect to FIG. 1, the local coordinator 110a can communicate with each of the local non-coordinator devices 121a-125a via primary local wireless links 130a, while the local non-coordinator devices 121a-125a can communicate with each other via secondary local wireless links 140a.

The child network 100b includes a child coordinator 110b, and child non-coordinator devices 121b and 122b. In this example, the child coordinator 110b is the same as the third local device 123a. As noted above with respect to FIG. 1, the child coordinator 110b communicates with the child non-coordinator devices 121b and 122b via primary child wireless links 130b, while the child non-coordinator devices 121b and 122b communicate with each other via secondary child wireless links 140b. The neighbor network 100c includes a neighbor coordinator 110c, and neighbor non-coordinator devices 121c and 122c. As noted above with respect to FIG. 1, the neighbor coordinator 110c communicates with the neighbor non-coordinator devices 121c and 122c via primary neighbor wireless links 130c, while the neighbor non-coordinator devices 121c and 122c communicate with each other via secondary neighbor wireless links 140c. The neighbor coordinator 110c communicates with the local coordinator 110a through a tertiary wireless link 560. Thus in accordance with the present invention, overlapping networks can conduct communication using reduced duty cycle UWB signals in nominal time slots to share a channel.

Devices in a single network can also be configured to share a channel. Using a conventional TDMA scheme, if local devices 121a and 122a wanted to transfer data to each other, and local devices 124a and 125a wanted to transfer data to each other, each device would have to transmit in different assigned time slots 250 to avoid interfering with each other. However, using the reduced duty cycle transmissions described above, each device pair in the above example could be assigned a different position in a nominal time slot 260, and transmissions between each of the two above described pairs could take place during the same assigned time slot 250. Such a scheme can be considered as a media access control scheme operated within the assigned time slot 250 as will be described in greater detail hereafter.

For example, the local devices 121a and 122a can be assigned a first position in the nominal time slot 260 for transmitting reduced duty cycle UWB signals such as bursts, while the local devices 124a and 125a could be assigned a second position in the nominal time slot 260 for transmitting reduced duty cycle UWB signals such as bursts. With reference again to FIG. 3, the first position could correspond to the burst interval 323 in the UWB signal 320 and the second position could correspond to the burst interval 333 within the UWB signal 330. If a single device wished to transfer data to three devices, the positions within the nominal time slot 260 for the three devices could correspond to burst interval 323 of combined UWB signal 350 for one of the devices, burst interval 333 of combined UWB signal 350 for another of the devices, and burst interval 333 of combined UWB signal 350 for the third of the three devices. The allocation of the positions within the nominal time slot 260 will be subject to a separate media access control scheme as will be described hereinafter.

The access channel can also be shared between devices in parent and child networks. If local devices 121a and 122a wanted to transfer data, and child devices 121b and 122b wanted to transfer data, under conventional TDMA schemes, different assigned time slots 250 would be required for each pair to avoid interfering with each other. However, using the reduced duty cycle transmissions described above, each device pair in the above example could be assigned a different position in a nominal time slot 260, and the two transmissions could take place during the same assigned time slot 250.

As above, the local devices 121a and 122a could be assigned a first position in a nominal time slot 260 for transmitting burst intervals of reduced duty cycle UWB signals, while the child devices 121b and 122b could be assigned a second position in a nominal time slot 260 for transmitting burst intervals of reduced duty cycle UWB signals. Again, if the time slot were arranged as shown by way of example in FIG. 3, the first position could correspond to the first UWB signal 320 and the second position could correspond to the second UWB signal 330. The access channel can also be shared between devices in neighbor networks. If local devices 121a and 122a wanted to transfer data, and neighbor devices 121c and 122c wanted to transfer data, under conventional TDMA schemes they would have to do so in different assigned time slots 250 to avoid interfering with each other. Using the reduced duty cycle transmissions described above, each device pair in the above example could be assigned a different position in a nominal time slot 260, and the two transmissions could take place during the same assigned time slot 250.

In any of these cases, all that would be required to arrange a proper sharing of the channel time would be for all of the coordinators 110a, 110b, and 110c to pass information regarding which network and which devices were assigned which positions within a nominal time slot 260. In some embodiments it would be possible to have four transmissions, such as two within the local network 100a, one within the child network 100b, and one within the neighbor network 100c take place at once, providing the nominal time slots 260 could accommodate four UWB signals.

Although the above examples are shown as being related to a wireless channel, alternate embodiments can apply to any situation in which a limited data channel must be shared among multiple devices or networks.

Also, although the above examples are shown as being used with UWB signals, this scheme is also applicable to any TDMA transmission scheme. It is further important to note that the TDMA transmission scheme described herein can be used within a local network regardless of the separation scheme used in neighboring networks or the like. In other words, Frequency Division Multiple Access (FDMA) or Code Division Multiple Access (CDMA) can be used for separation between networks while still using a TDMA scheme within a network.

Media Access Control

As described hereinabove, the allocation of what amounts to slots within the timeslot 250 amounts to an additional layer of media access control where, for example, the timeslot 250 is treated as the media and the positions are allocated based on one of several methods to be described. For example, the access can be contention based such as in a pure CSMA environment where devices negotiate positions within the timeslot 250 leading to distributed media access. The access can be centrally controlled such as in a master-slave environment, for example, as described hereinabove, or a combination of the two.

Figure 6:
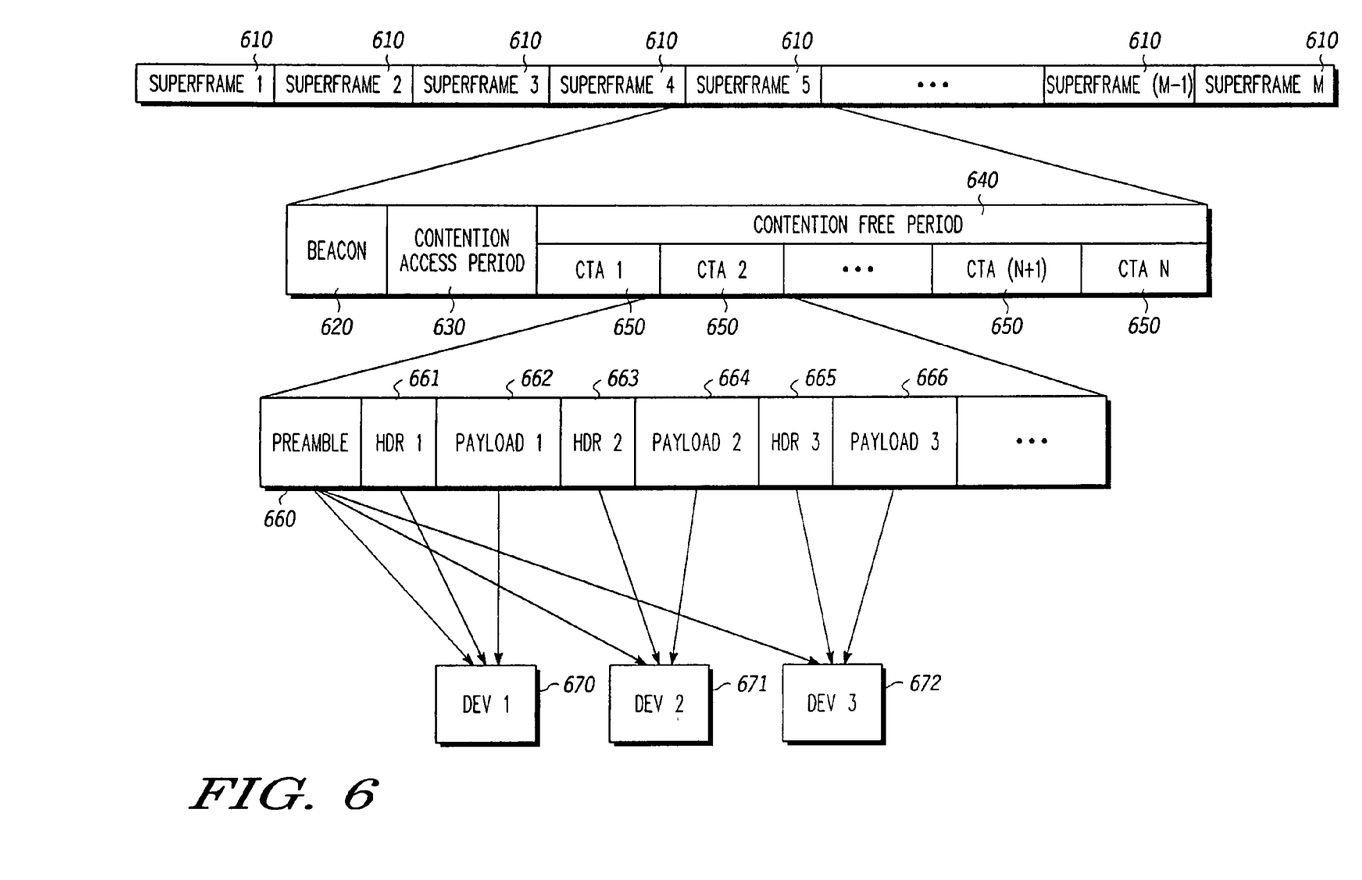
FIG. 6 is a diagram illustrating an alternative exemplary organizational hierarchy of a TDMA scheme including superframes, time slots, and an aggregated data packet for multiple destination devices, according to an embodiment of the present invention.

With reference to FIG. 6, a hierarchical TDMA environment similar to that shown in FIG. 2 includes superframes 610, each including a beacon interval 620, a CAP 630, a CFP 640 having CTAs 650 such as CTA 1 through CTA N. As noted above, during the CAP 630, devices can contend or negotiate for slot or CTA assignments. Once the CAP 630 expires, CTAs are assigned and transmissions can begin. It will be appreciated that in accordance with some embodiments, controllers can negotiate during the CAP 630 for CTAs and devices assigned to controllers can wait be assigned to positions within the nominal slots. Alternatively, all devices can negotiate for CTAs and controllers can further assign within the nominal slots. Since the duration of the CTA can vary according to individual protocol implementations, aggregation of data to be transferred within the nominal slots allocated within a CTS can also be adjustable based on the different operating parameters such as the PHY parameters, number of nominal slot assignments, the CTA duration, transmit average power limits, and the like. Since the CTA size is relatively fixed during operation, and since the allocation of the nominal slots can be controlled in accordance with the invention, it is preferable to maintain aggregation flexibility to adapt to different data types or Quality of Service types such as streaming media, or non-real time content such as Internet browsing content or the like and to achieve higher efficiency and utilization.

Thus in accordance with one basic embodiment, a controller can communicate within its assigned CTA 650 to many devices such as a DEV 1 670, a DEV 2 671, and a DEV 3 672 using an aggregated packet which can be sent within the CTA 650 from, say, a controller or master, having a preamble 660 and a header payload combination for each of the DEV 1 670, the DEV 2 671, and the DEV 3 672. During the preamble, each device within range of the master or controller will train on the preamble 660 in a manner known in the art, and, for example, the DEV 1 670 can process a HDR 1 661 and a corresponding payload PAYLOAD 1 662, the DEV 2 671 can process a HDR 2 663 and a corresponding payload PAYLOAD 2 664, the DEV 3 672 can process a HDR 3 665 and a corresponding payload PAYLOAD 3 666. Such a scheme adequately supports one to one and one to many transmission scenarios. In the case where transmit power requirements are based on single transmitter-receiver pairs, it is contemplated that a transmission scenario involving a single transmitter bursting during a nominal time slot to multiple receivers can exceed the average power levels transmitted on the air interface by a factor of N times the average power provided the duty cycle of the transmission burst is approximately (1/N)× 100% consistent, for example, with the descriptions provided herein above. Thus reduced duty cycle transmissions can be "hot" by a factor inversely proportional to the duty cycle.

Figure 7:
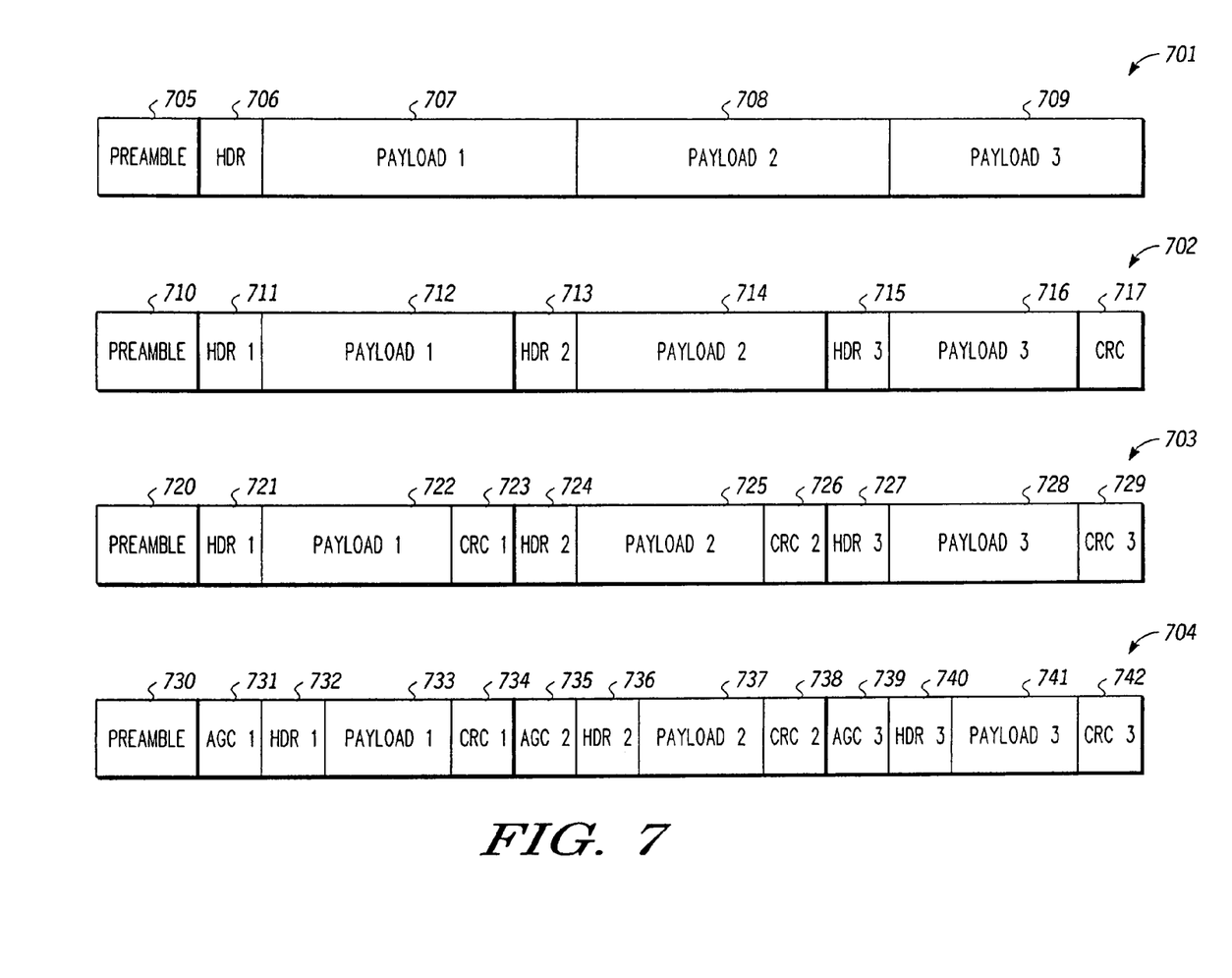
FIG. 7 is a diagram illustrating several alternative aggregated data packet configurations, according to various embodiments of the present invention.

To provide additional management of parameters within the CTA 650, for example in the form of MAC functionality, additional protocol features can be adapted such as forward error correction (FEC), automatic gain control, power control, and the like to support multiple transmissions within the slot. Examples of various configurations are shown in FIG. 7. Aggregated packets 701, 702, 703, 704 represent increasing levels of complexity associated with MAC features. For example in the aggregated packet 701, a preamble 705 can contain sequences for allowing devices to train for receiving information as will be appreciated by one of skill in the art. Composite header information can be contained in a HDR 706 such as information for devices regarding where information destined for the devices is located. Information for devices can be contained for example in a payload 1 707 for a first device, a payload 2 708 for a second device, and a payload 3 709 for a third device. It will also be appreciated that aggregated packet 701 is rudimentary in nature and poses problems such as the inability of devices to easily ascertain payloads. Accordingly, additional information can be presented as shown in connection with the aggregated packet 702 such as additional headers for each payload.

As in the aggregated packet 701, the aggregated packet 702 contains a preamble 710 for receiver training and synchronization, and is followed by a HDR 1 711 and PAYLOAD 1 712 directed by address to the first device, a HDR 2 713 and PAYLOAD 2 714 directed by address to the second device, and a HDR 3 715 and PAYLOAD 3 716 directed by address to the third device. It will be appreciated that one problem with aggregation is error handling. For example, with no forward error correction, devices cannot determine that data within the payload is erroneous and may attempt to treat erroneous or missing data as valid. Since there is no error correction mechanism, the device will continue to treat erroneous or missing data as valid with unpredictable and undesirable consequences at higher protocol layers. Thus, additional functionality in the form of forward error correction (FEC) can be added in the form of a cyclic redundancy check (CRC) checksum, a frame check sequence (FCS), or the like at the end of each payload as can be seen in the aggregated data packet 703.

As in other configurations, the aggregated data packet 703 can contain a preamble 720, and individual headers such as a HDR 1 721, a HDR 2 724, and a HDR 3 727 for each of a PAYLOAD 1 722, a PAYLOAD 2 725, and a PAYLOAD 3 728. A checksum or the like such as a CRC 1 723, a CRC 2 726, and a CRC 3 729, can be provided for each of the PAYLOAD 1 722, the PAYLOAD 2 725, and the PAYLOAD 3 728. It will be appreciated that error control can be conducted in one of a number of known manners involving acknowledgement, retransmission and the like. However, it is also known that bandwidth penalties and overall throughput penalties will result from the addition of FEC.

To further enhance MAC functionality within the CTA 650, automatic gain control (AGC) can be added to respective payloads to improve receiver training. Thus, the aggregated data packet 704 can contain a preamble 730, and individual headers such as a HDR 1 732, a HDR 2 736, and a HDR 3 740 for each of a PAYLOAD 1 733, a PAYLOAD 2 737, and a PAYLOAD 3 741. A checksum or the like such as a CRC 1 734, a CRC 2 738, and a CRC 3 742, can be provided for each of the PAYLOAD 1 733, the PAYLOAD 2 737, and the PAYLOAD 3 741. To provide AGC for device receivers, an AGC 1 731, an AGC 2 735, and an AGC 3 739 can be provided ahead of each of the HDR 1 732, the HDR 2 736, and the HDR 3 740 such that receiver sections within devices can adjust gain parameters to increase the fidelity of the reception.

Figure 8:
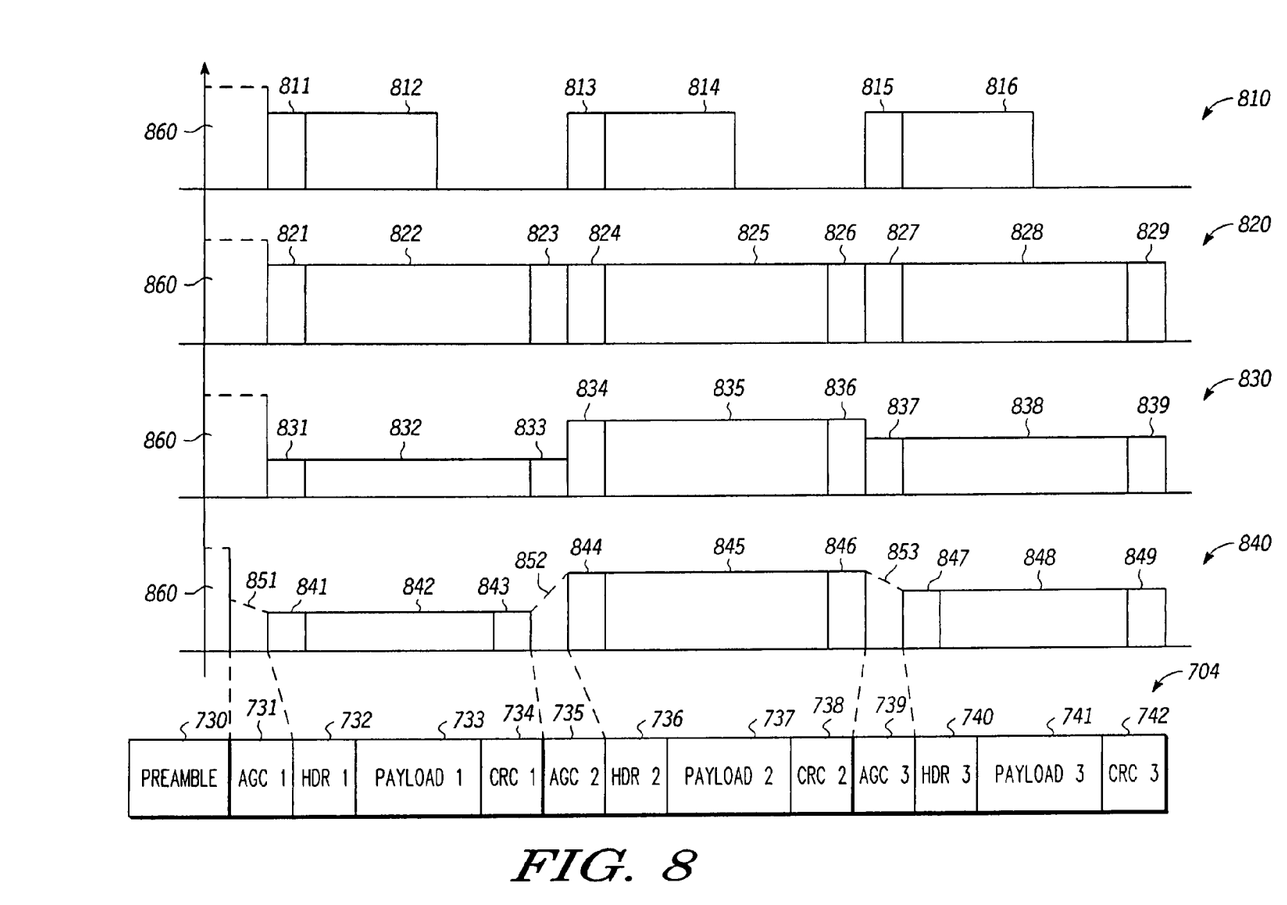
FIG. 8 is a diagram illustrating fractional duty cycle transmissions, transmissions at different power levels, and power control, according to various embodiments of the present invention.

In connection with transmitting using reduced duty cycles as described herein above, an exemplary CTA 650 can be used to transmit between multiple devices using the aggregated packets as described and reduced duty cycle transmissions. It will be appreciated that for simple applications, a reduced duty cycle transmission possibly including a guard time as also discussed above, can be used to provide separation between bursts. In exemplary scenario 810, a payload 812, a payload 814, and a payload 816 can include respectively a header 811, a header 813, and a header 815 and can be isolated from other bursts within the CTA 650. In exemplary scenario 820, a payload 822, a payload 825 and a payload 828 can include respectively a header 821, a header 824, and a header 827, and also can include respectively a CRC 823, a CRC 826, and a CRC 829. It will be appreciated that by adding the CRC blocks to the end of payloads density can be increased within the CTA 650 provided however that transmit power limits are maintained as discussed at length herein.

In some embodiments, power levels for each device can be varied, again provided that the total average power does not exceed limits. It should also be remembered that, as noted above, in scenarios where a single transmitter is transferring data to N multiple receivers, it may be possible to exceed power limits by a factor of N times particularly where the power limits are measured based on one transmitter-receiver pair. Thus, a transmitter bursting to N receivers can be viewed as N transmitter receiver pairs. In exemplary scenario 830, bursts to different devices use different power levels. A payload 832, a payload 835 and a payload 838 can include respectively a header 831, a header 834, and a header 837, and also can include respectively a CRC 833, a CRC 836, and a CRC 839. Since each of the bursts is transmitted with a different power level, portions of the header may be received with poor fidelity increasing the probability of error. Thus it will be appreciated that AGC can improve fidelity in such cases. It should also be noted that, for example as described hereinabove with reference to FIG. 4, higher transmit power levels generally correspond to shorter duty cycles not necessarily apparent from FIG. 8.

It will be further appreciated that to improve the speed and quality of receiver operations such as, for example, signal acquisition and the like, performed by an exemplary receiver, the preamble 730 can be transmitted at a variable power level or at a higher power level than the other signal portions. A preamble portion 860 is shown for each of the exemplary scenarios 810-840 corresponding, for example, to a preamble such as the preamble 730. The preamble portion 860 is transmitted or bursted at a relatively "hot" level, such as several dB or greater, compared to the power level of the payload portions of the aggregated packet. It should further be noted that by transmitting the preamble in such a manner, certain AGC issues may need to be addressed as will be appreciated by one of ordinary skill. Such issues could include gain instability during preamble reception and could be addressed by, for example, disabling receiver AGC during preamble reception or the like.

When AGC is applied, such as in exemplary scenario 840, the aggregated packet 704 is used to transfer data and provide AGC. After the preamble 730 is processed by all devices, the AGC 1 731 can be used to set the levels corresponding to the new transmit power level for a header 841 and a payload 842. An adjustment interval 851 can be used to "ramp" power from the previous level to the new level giving the receiver time to adapt to the appropriate level. After a CRC 843, an adjustment interval 852 associated with the AGC 2 735 can allow a device receiver to adapt to a new power level associated with receiving a header 844 and a payload 845. After a CRC 846, another adjustment interval 853 associated with the AGC 3 739 can allow a device receiver to adapt to a new power level associated with receiving a header 847, a payload 848, and a CRC 849 and so on. It will be appreciated that power control can be implemented by closed loop power control where devices can engage in reporting received power levels and controllers, coordinators, masters, or the like can adjust power levels accordingly. Open loop power control can also be used where a controller, coordinator, master or the like can adjust power levels until a desired result is achieved, such as a response from a slave device, or until limits are reached.

Figure 9:
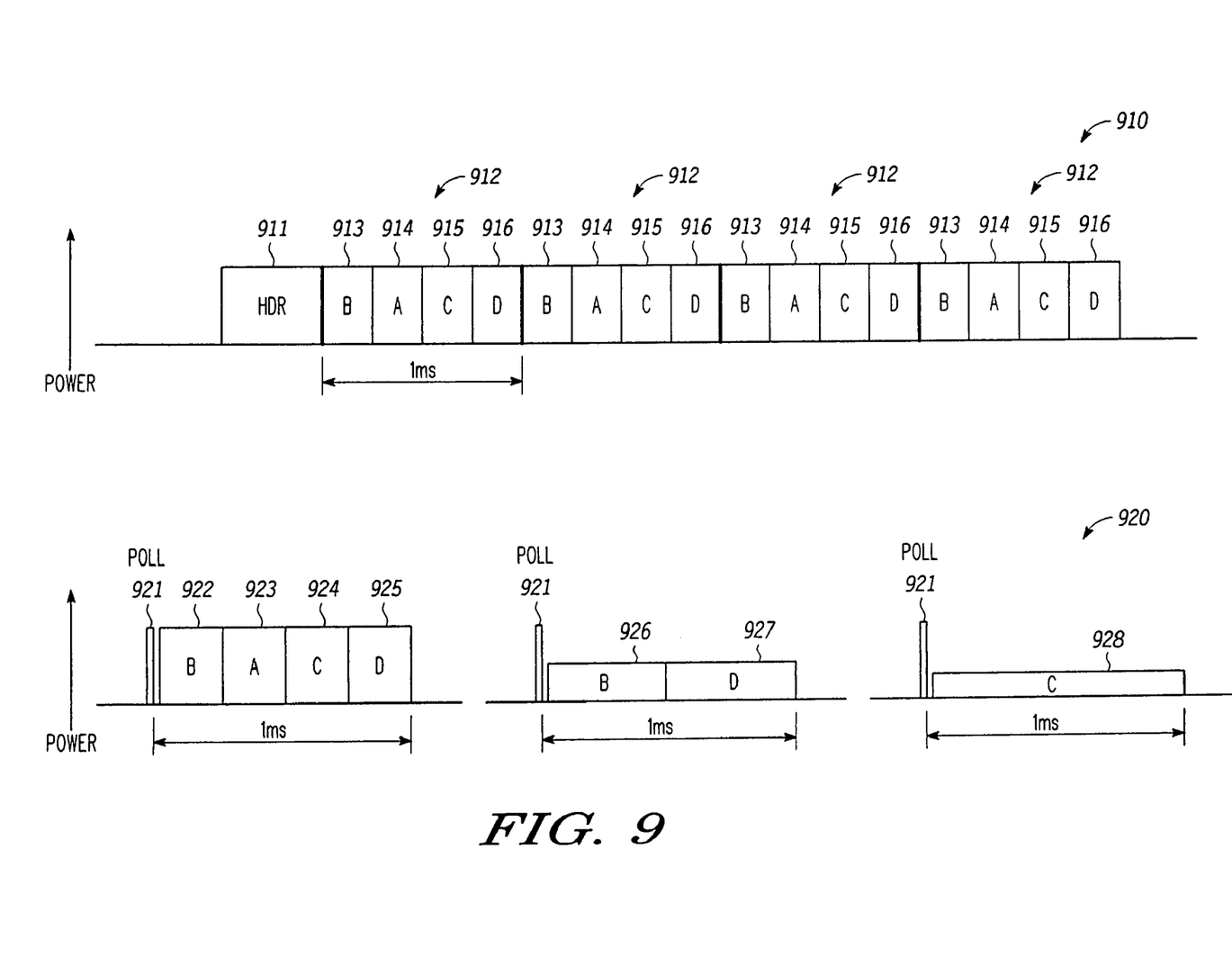
FIG. 9 is a block diagram illustrating fractional duty cycle transmissions according to exemplary asynchronous and isochronous timing methods, according to various embodiments of the present invention.

It will be appreciated that the MAC approaches described herein can be adapted to a number of transmission environments as shown in FIG. 9. Asynchronous environments for example, which are more random and demand oriented, may have data during some time periods and no data during other time periods. Isochronous environments may be more constant such as in support of streaming data transfer. In exemplary scenario 910, representing for example, an isochronous environment, assignments within CTA 650 may be established using a HDR 911 and can occur for example during a negotiation or contention period as described hereinabove. In each of sequences 912, which can represent subsequent instances of CTA 650, device B can be assigned to position 913, device A can be assigned to position 914, device C can be assigned to position 915, and device D can be assigned to position 916. It will be appreciated that in accordance with various aspects discussed herein, transmission bursts occupying positions 913-916 can be transmitted with reduced duty cycles such that power limits are met over the measuring time, which for illustrative purposes is shown to be 1 ms, but can be longer or shorter depending on various factors including the particular revision of an applicable standard, the prevailing UWB standard such as IEEE 802.15.3(<x>) and the like.

In exemplary scenario 920, various examples of transmission bursting in an asynchronous environment according to an exemplary polling scheme are shown. In the first example, a polling signal 921 from a controller, master, coordinator or the like, can be issued or transmitted within the environment, and any of devices A, B, C, and D having data can transmit information during respective assigned intervals such as an interval 922 for A, an interval 923 for B, an interval 924 for C, and an interval 925 for D. It will be appreciated that the intervals can represent transmission from one device to devices A, B, C, and D. Bursts within each of the intervals can be at a reduced duty cycle as described herein such that transmit power levels limits are reached. As also described, for the case where compliance to power limits is measured based on single transmitter receiver pairs, the level for each of the intervals can be hotter by an amount inversely proportional to the duty cycle. Accordingly, in the next example, after the polling signal 921 is issued, transmissions associated with an interval 926 for device B, and an interval 927 for device D are transmitted at a lower power level corresponding inversely to the increased duty cycle. In other words, in the previous example, with four intervals, the duty cycle can be at, say 25% resulting in a fourfold increase in the average power. In the present example, with a 50% duty cycle, a two fold increase in the average power is possible. In a third example, a single transmission burst interval 928 is transmitted after the polling signal 921. Since only a single transmission is present, there is no increase in average power. Since the single, 100% duty cycle burst must meet the average power over the interval, normal power levels are used.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention. The various circuits described above can be implemented in discrete circuits or integrated circuits, as desired by implementation. Further, portions of the invention may be implemented in software or the like as will be appreciated by one of skill in the art and can be embodied as methods associated with the content described herein.

The invention claimed is:

1. A method for transmitting signals in a wireless network, comprising:
    dividing a transmission time into M time slots; and
    repeating for each of the M time slots as a selected time slot,
        dividing the selected time slot into N allocation intervals, each of the N allocation intervals having an assigned interval duration, each of the interval durations representing an assigned fraction of the selected time slot;
        determining an assigned power level for each of the N allocation intervals, respectively;
        assigning N different device pairs in the wireless network to the N allocation intervals, respectively; and
        transmitting information between the N different device pairs in respective ones of the N allocation intervals,
    wherein for each of the N allocation intervals, the respective assigned power level is determined such that the respective assigned power level multiplied by the assigned fraction of the time slot is less than or equal to a threshold power,
    wherein M is an integer greater than 1, and
    wherein N is an integer greater than 1.

2. The method of claim 1, wherein each of the M time slots includes a preamble addressed to all of the devices in the wireless network.

3. The method of claim 1, wherein each of the N allocation intervals includes an information payload and a header unique to the assigned device pair.

4. The method of claim 1, wherein each of the M time slots has a duration that corresponds to a power measurement duration of a wireless protocol associated with the wireless network.

5. The method of claim 1, wherein each of the M time slots has a duration of approximately 1 millisecond.

6. The method of claim 1, wherein the threshold power is a root-mean-square average of approximately −41.3 dBm/MHz.

7. A method for transmitting signals in a wireless network, comprising:
    dividing a transmission time into M time slots; and repeating for each of the M time slots as a selected time slot,
  dividing the selected time slot into N allocation intervals, each of the N allocation intervals having an assigned interval duration, each of the interval durations representing an
assigned fraction of the selected time slot;
  determining an assigned power threshold for each of the N allocation intervals, respectively;
  assigning N different device pairs in the wireless network to the N allocation intervals, respectively; and
  transmitting information between the N different device pairs in respective ones of the N allocation intervals at power levels no greater than a respective assigned power threshold,
  wherein for each of the N allocation intervals, a respective assigned power threshold is equal to a maximum power threshold multiplied by the assigned fraction of the time slot of the respective one of the N allocation intervals,
  wherein M is an integer greater than 1, and
  wherein N is an integer greater than 1.

8. The method of claim 7, wherein each of the M time slots includes a preamble addressed to all of the devices in the wireless network.

9. The method of claim 7, wherein each of the N allocation intervals includes an information payload and a header unique to the assigned device pair.

10. The method of claim 7, wherein each of the M time slots has a duration that corresponds to a power measurement duration of a wireless protocol associated with the wireless network.

11. The method of claim 7, wherein each of the M time slots has a duration of approximately 1 millisecond.

12. The method of claim 7, wherein the threshold power is a root-mean-square average of approximately −41.3 dBm/MHz.

* * * * *